May 24, 1938. G. A. SNYDER 2,118,329
BLOOD PRESSURE TESTING APPARATUS
Filed June 22, 1934
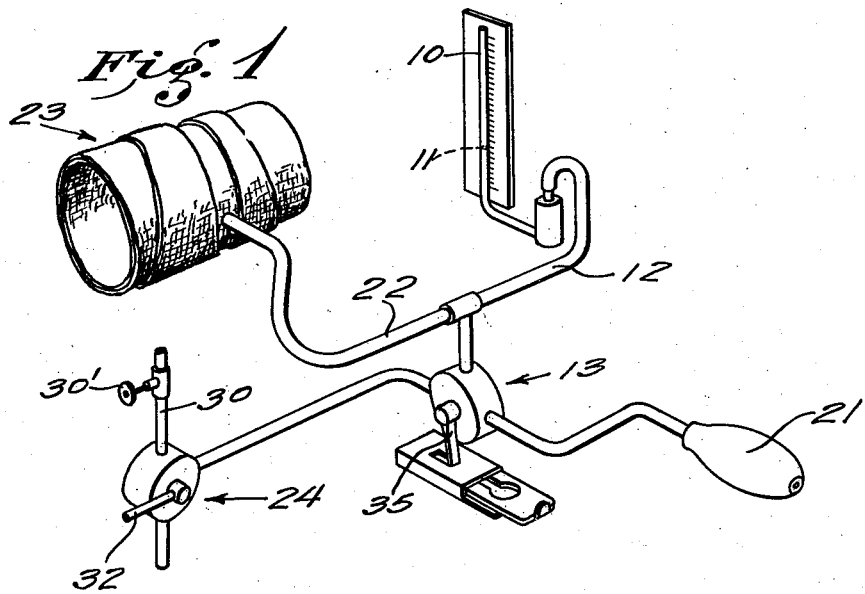
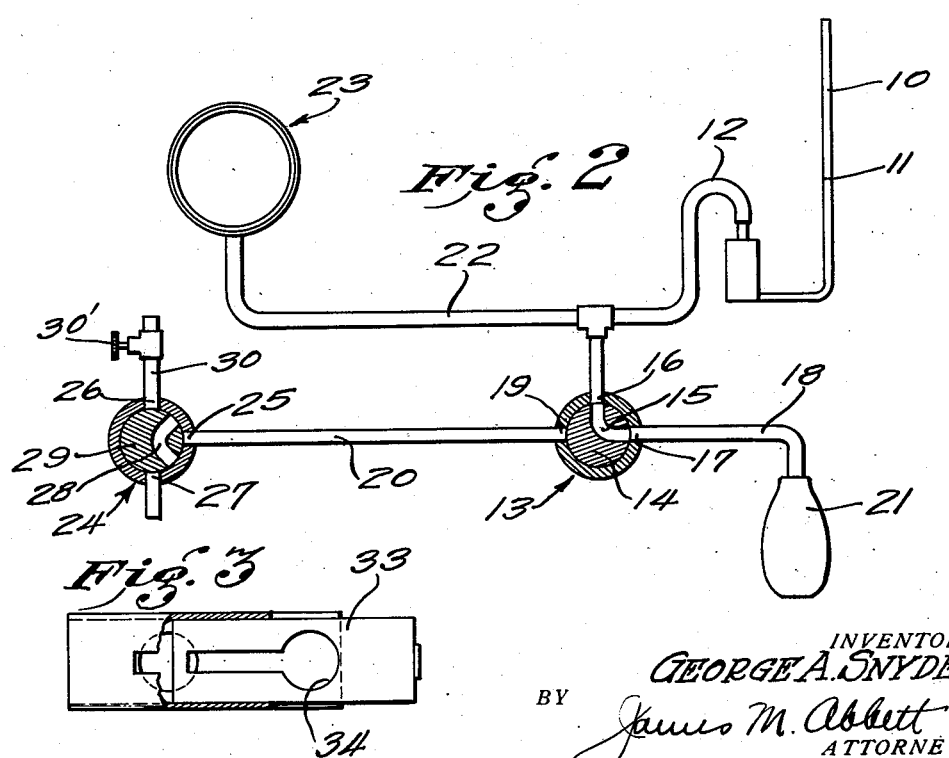
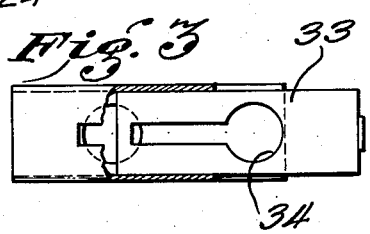
INVENTOR
GEORGE A. SNYDER
BY
James M. Abbett
ATTORNEY Patented May 24, 1938

2,118,329

UNITED STATES PATENT OFFICE 2,118,329

BLOOD PRESSURE TESTING APPARATUS

George A. Snyder, West Hollywood, Calif.

Application June 22, 1934, Serial No. 731,890

5 Claims. (Cl. 128—2.05)

This invention relates to blood pressure testing apparatus and particularly pertains to mechanical equipment by which blood pressure tests may be made in connection with the human body.

At the present time blood pressure testing apparatus is in the hands of the medical profession and blood pressure tests are made by them. The operation of such apparatus is quite simple, however, and since it is quite desirable that a person should be aware of the condition of his blood pressure in order to properly take care of his health it is the object of the present invention to provide a simple and accurate blood pressure testing apparatus which may be placed in the hands of the general public, and which is preferably coin controlled so that it may be conveniently available in public places for those desiring to obtain accurate measurement of their blood pressure. The present invention contemplates the provision of fluid pressure indicating or measuring means suitably connected with means for imposing a desired pressure upon the area of a human body adjacent to an artery whereby the fluid indicating means will be responsive to pressures transmitted from the artery through the fluid medium, said structure further contemplating means for creating a desired fluid pressure in the system and for permitting it to be gradually relieved as the measurement is made.

The invention is illustrated by way of example in the accompanying drawing in which:

Figure 1 is a view in diagram indicating a form which the present invention may take.

Fig. 2 is a schematic view in section and elevation showing a form of valve arrangement.

Fig. 3 is a view disclosing coin operated means for the control valve.

Referring more particularly to the drawing, 10 indicates a mercury manometer within which the usual mercury column 11 is confined. It is to be understood that while a mercury manometer is here shown as the instrumentality for measuring fluid pressures that it will be within the contemplation of the present invention to utilize other means, such as an oscillator meter, or other indicating means responsive to variation in fluid pressure. In communication with the manometer is a conduit 12 which connects with a housing of a two-way valve 13. A rotary valve member 14 is within this housing and is formed with an angle shaped valve passageway 15 which may be brought to register with a valve port 16 communicating with the conduit 12, a valve port 17 communicating with a pressure supply conduit 18, or a valve port 19 communicating with a relief conduit 20. The conduit 18 is here shown as connected with the usual pneumatic bulb 21 by which a desired fluid pressure is established in the apparatus. It will be understood, however, that in place of the manually operated bulb 21, a container of fluid under pressure might be maintained in the apparatus, or that the device might be conveniently provided with a pump, either manually operated or actuated by driving means set in motion optionally. In any event a desired fluid pressure would be imposed upon the manometer through the conduit 12 when the angular passageway in the valve member 14 is brought to register with valve ports 16 and 17. At such a time fluid under pressure also will be delivered from the conduit 12 to a tube 22 which is shown as being connected with a cuff 23. Usually this cuff is in the form of a flexible member adapted to be wrapped around the limb of the person upon whom a test is to be made and to be secured in position, the cuff embodying a fluid receiving compartment in communication with the tube 22. By this arrangement it is usual to impose a desired fluid pressure upon the area of the human body through which an artery passes so that the pressure of the blood in the artery will be imposed upon the fluid pressure confined within the compartment of the cuff, thereby transmitting a pressure impulse by the fluid to the manometer to displace the mercury in the column and to cause a desired reading to be made. It will be understood that the fluid pressure impulse might be obtained from the artery by various other mechanisms operating on mechanical or fluid pressure principles, and that the cuff is merely shown here as a desired embodiment of the invention.

In making accurate blood pressure readings it is necessary to ascertain the systolic and the diastolic pressures. This is done by imposing a pressure upon the artery in excess of its maximum or systolic pressure, and thereafter relieving the pressure until the pressure applied to the artery is substantially less than that occurring within the artery. This will cause the indicating structure to reflect the heart pulsation, and in the event that the indicating instrument is a manometer the mercury column will pulsate. In the event that an aneroid sphygmomanometer is used the needle would oscillate under such a condition. During this period the reading may be made by observing the fluctuating fluid pressure or by means of characteristic sounds produced in the artery and detected by a stethoscope or other audible means. In the present instance the relief of such pressure is mechanically controlled by a two-way valve 24, provided with valve ports 25, 26 and 27. Mounted within the valve structure is a rotary valve member 29 formed with an angular passageway 28 which may alternately establish control between the ports 25 and 26, or 25 and 27. The port 25 connects with the relief conduit 20. The port 26 is provided with a pipe 30 and with a relief valve structure 30' by which the fluid from the pressure system may be slowly relieved. The port 27 may be in direct communication with the atmosphere or may be connected with an outlet pipe by which fluid from the pressure system may be rapidly relieved. A lever arm 32 is provided to operate said valve.

In the present case it is contemplated that the pressure apparatus will be placed at the disposal of the general public and that the device will be coin controlled. The coin control mechanism may be of any desired type, and is shown in Fig. 3 as comprising a sliding plate 33 having a coin opening 34 therein which coin engages and moves an actuating member 35 when the plate is forced inwardly. The actuating member is operatively connected to the rotating valve element 14 of the control valve 13 and is so positioned as to insure that when the coin plate is forced inwardly with the coin it will move the rotary valve member 14 from a position where its angular passageway 15 was in register with ports 16 and 19 to a position where said passageway will be in register with ports 16 and 17, the coin operated structure being designed to act in a reverse manner when the plate 33 is moved to its retracted position.

In operation of the present invention it is to be understood that the apparatus here disclosed is designed to be made available for use by the general public, and that the structure here disclosed is enclosed within a suitable housing not shown, but which is designed as to present the coin control member 33, the bulb 21, the lever 32, and the cuff 23 available for operation by the person who desires to test his blood pressure. The cuff 23, or other means for applying pressure to an artery, is suitably disposed with relation to the artery area. Attention is directed to the fact that accuracy in a blood pressure test is greatly dependent upon the position of rest of the left arm on which the cuff is applied, and it will, therefore, be recognized that the blood pressure machine must be capable of manual operation by the right hand only, since the left hand is not available for this purpose. The coin is placed in the coin opening 34 and the plate 33 is forced inwardly. This will actuate the member 35 to rotate the valve member 14 of the valve 13 to the position shown in solid lines in Fig. 2 of the drawing. This will establish direct connection between the bulb 21 and the manometer 10, and also direct connection through the tube 22 to the cuff 23. Due to the arrangement of the valve 13 and the coin operating mechanism the valve and plate 33 will remain motionless in either of their positions until moved by the operator. Thus, when the coin plate is forced inwardly to establish communication between the tube 18 and the tubes 12 and 22 leading to the cuff and manometer, respectively, this valve will remain in its position while the bulb 21 is being manipulated to deliver air to the cuff. The bulb 21 may then be manipulated to increase the air pressure in the cuff and thus simultaneously increase the fluid pressure upon the column of mercury 11 in the manometer 10 to raise the same. When the top of the column has been raised to an indicated maximum the coin plate 33 is moved outwardly to its retracted position and will act to rotate the valve member 14 of the valve 13 to dispose the angular passageway 15 thereof to place its opposite legs in register with ports 16 and 19 in which position the valve 13 will remain without further attention until a coin operation is required again. This will seal off the conduit 12 from the bulb, and thus maintain the established fluid pressure within the cuff and the manometer. At the same time direct connection will be made between the conduit 12 and the relief conduit 20. Under normal conditions the rotary valve element 29, of relief valve 24, will be so positioned as to prevent the escape of fluid from the relief conduit 20. At this time the operating lever 32 is standing in a neutral position. The blood pressure reading may then be taken by moving the lever 32 in a manner to bring the angular passageway 28 of the rotary valve member 29 of relief valve 24 into position to register with ports 25 and 26. Air may then escape from the tube 30 at a rate of flow established and controlled by an adjusting valve 30'. As the fluid gradually escapes from the pipe 12 through the two valves 13 and 24 the mercury column will gradually lower, and as it lowers the fluid pressure within tubes 12 and 22 will gradually decrease until it equals and finally becomes lower than the pressure of the blood in the artery. During this variation of pressure systolic and diastolic blood pressure may be read by oscillation or sound methods or by means actuated by them. After that the lever 32 may be moved to rotate the valve element 29 to a position where its angular passageway 28 will register with ports 25 and 27. This will instantly permit the fluid pressure in the entire system to be relieved so that the cuff may be removed. It will also be evident that in the event a person finds the cuff uncomfortable the pressure may be instantly removed from the cuff in an emergency.

It will thus be seen that the apparatus here disclosed is quite simple in its construction, that it has few operating parts, and can be easily manipulated even by those who have had no skill or experience in taking blood pressure, and that the simplicity of the device makes the structure especially adapted for coin controlled operation.

While I have shown the preferred form of my invention, as now known to me, it will be understood that various changes may be made in the combination, construction, and arrangement of parts, by those skilled in the art, and furthermore that more easily readable devices, such as needle oscillators, lights, sound amplification means, graph or ticket producing means, may be actuated by means to measure arterial pressure in order to make the device more acceptable to the general public, without departing from the spirit of the invention as claimed.

Having thus described my invention, what I claim and desire to secure by Letters Patent is:—

1. A blood pressure testing apparatus to be operated by the person whose blood pressure is tested which comprises a cuff adapted to be positioned upon one arm of the person, an indicating device, a tube connecting the cuff to the indicating device, a tube connected with said first named tube, a two-way valve structure connected with said last named tube, air pressure supplying means connected with said valve structure, a relief tube connected with said valve structure, the valve being capable of being set in alternate positions to establish communication between the air pressure supplying means and the tubes with the cuff and indicator or between the relief tube and the cuff and indicator, a two-way relief valve with which the relief tube communicates and having two relief outlets, a bleeder valve in communication with one of said outlets and adapted to be regulated to gradually relieve the pressure from the cuff and indicator as a reading is being taken and the two-way valve is set in one of its positions, and a relief outlet which may be placed in communication with said relief tube when the two-way valve is set in its other position to suddenly allow the air to exhaust from the cuff and indicator fluid pressure system.

2. A blood pressure testing apparatus adapted to be operated by the person whose blood pressure is to be tested which comprises a two-way control valve, a hand operated air bulb connected with one side of said valve, a relief pipe connected with the opposite side of said valve and a pressure pipe adapted to be placed in alternate communication with said bulb and relief pipe and to remain in said set position until moved, a pressure tube in communication with the pressure pipe, a cuff at one end of said tube, a pressure indicating device at the opposite end of said tube, a two-way relief valve in communication with the relief pipe, a set bleeder valve in communication with an outlet from the two-way relief valve and an exhaust opening in the relief valve, said valve being manually operated to move the valve element from a position establishing communication between the relief pipe and the bleeder valve or between the relief pipe and the exhaust opening.

3. A public blood pressure testing apparatus adapted to be operated by the person whose blood pressure is being tested and which comprises a pressure cuff adapted to be placed upon the arm of the operator, a pressure indicating device, a conduit common to the cuff and indicating device, a pressure delivery tube in constant communication with said conduit, a two-way valve structure with which said delivery tube communicates, means for actuating the valve to set it in alternate positions, an air pressure bulb in communication with the pressure conduit when the valve is set in one of its positions, an air relief pipe in communication with the pressure conduit when the valve is set in the other of its positions, a two-way relief valve in communication with said relief pipe, actuating means therefor, an adjustably set bleeder valve in communication with said relief pipe when said relief valve is in one of its set positions, and an exhaust pipe in communication with the relief pipe when the valve is set in the other of its set positions.

4. A blood pressure testing apparatus adapted to be operated by the person whose blood pressure is to be tested, which comprises a control valve structure, an air supply connected with one side of said valve, a relief pipe connected with the opposite side of said valve structure and a pressure pipe adapted to be placed in alternate communication with said air supply and relief pipe and to remain in said set position until moved, a pressure tube in communication with the pressure pipe, a cuff at one end of said tube, a pressure indicating means at the opposite end of said tube, a relief valve structure in communication with the relief pipe, a set bleeder valve in communication with an outlet from the relief valve structure and an exhaust opening in the relief valve, said valve being operable and adapted to alternately establish communication between the relief pipe and the bleeder valve or between the relief pipe and the exhaust opening.

5. A blood pressure testing apparatus adapted to be operated by the person whose blood pressure is being tested and which comprises a pressure cuff adapted to be placed upon the arm of the operator, a pressure indicating device, a conduit common to the cuff and the indicating device, a pressure delivery tube in constant communication with said conduit, a valve structure with which the delivery tube communicates, means for actuating the valve structure to set it in alternate positions, an air supply in communication with the pressure conduit when the valve is set in one of its positions, an air relief pipe in communication with the pressure conduit when the valve is set in the other of its positions, a relief valve structure in communication with said relief pipe, actuating means therefor, an adjustable set bleeder valve in communication with said relief pipe when said relief valve is in one of its set positions, and an exhaust pipe in communication with the relief pipe when the valve is set in one of its set positions.

GEORGE A. SNYDER.